(12) United States Patent
Koerner et al.

(10) Patent No.: US 7,653,837 B2
(45) Date of Patent: Jan. 26, 2010

(54) MICROCONTROLLER SYSTEM AND OPERATING METHOD FOR SECURE DEVICE LOCKING USING COUNTER AND TIMER

(75) Inventors: Gotthilf Koerner, Weissach (DE); Berthold Fehrenbacher, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 11/547,949

(22) PCT Filed: Feb. 9, 2005

(86) PCT No.: PCT/EP2005/050567

§ 371 (c)(1), (2), (4) Date: Jun. 8, 2007

(87) PCT Pub. No.: WO2005/098557

PCT Pub. Date: Oct. 20, 2005

(65) Prior Publication Data

US 2007/0276968 A1 Nov. 29, 2007

(30) Foreign Application Priority Data

Apr. 10, 2004 (DE) ........................ 10 2004 017 719

(51) Int. Cl.
*G06F 11/00* (2006.01)

(52) U.S. Cl. ........................................................ 714/25
(58) Field of Classification Search .................. 714/10, 714/27; 701/76
See application file for complete search history.

(56) References Cited

U.S. PATENT DOCUMENTS

| 2001/0051848 A1* | 12/2001 | Ito ............................. 701/114 |
| 2002/0046362 A1* | 4/2002 | Bolz ........................... 714/23 |
| 2003/0154762 A1* | 8/2003 | Haas et al. ................... 73/1.01 |

FOREIGN PATENT DOCUMENTS

| DE | 100 18 859 | 10/2001 |
| DE | 100 30 991 | 1/2002 |

* cited by examiner

*Primary Examiner*—Nadeem Iqbal
(74) *Attorney, Agent, or Firm*—Kenyon & Kenyon LLP

(57) ABSTRACT

A microcontroller system includes a microcontroller, a device which is controllable by the microcontroller, and a monitoring device. Under the control of a normal operation program, the microcontroller outputs a normal operation indicating signal. If the normal operation indicating signal is absent, the monitoring device transfers the device into a secured state and, if it is absent over a predefined period of time, locks the device in that state. When predefined exceptional conditions occur, the microcontroller changes to an operation preparation program, and the monitoring device increments a register. If the contents of the register reach a predefined value, the monitoring device locks the device in the secured state.

9 Claims, 1 Drawing Sheet

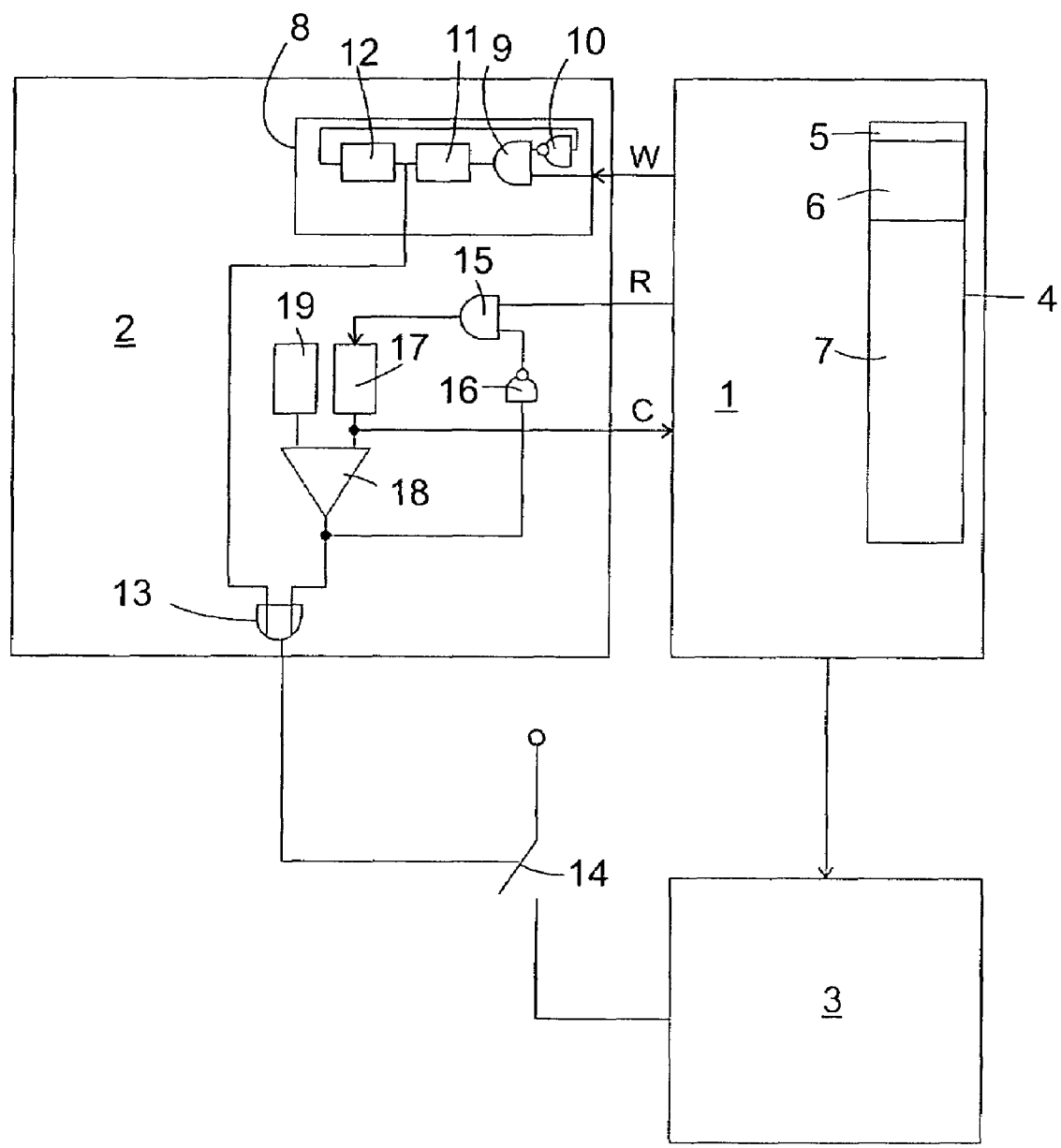

MICROCONTROLLER SYSTEM AND OPERATING METHOD FOR SECURE DEVICE LOCKING USING COUNTER AND TIMER

FIELD OF THE INVENTION

The present invention relates to a microcontroller system having a microcontroller configured to execute an operation preparation program at each start of the system and under predefined exceptional conditions during operation and to change to a normal operation program after the operation preparation program has been executed and to output, under the control of the normal operation program, a normal operation indicating signal, and having a device which is controllable by the microcontroller, and a monitoring device for monitoring whether the microcontroller is executing the normal operation program by reference to the normal operation indicating signal.

BACKGROUND INFORMATION

Microcontroller systems of that kind are used to control diverse systems that are relevant to safety in motor vehicles, such as anti-lock braking systems, attitude control systems, hydraulic brake systems etc., the monitoring device serving to transfer the controlled device, such as a vehicle brake, attitude control actuators or the like, into a secured state when absence of the normal operation indicating signal indicates that the execution of the normal operation program by the microcontroller is defective and hence the operating reliability of the system as a whole is not guaranteed.

Absence of the normal operation indicating signal may be caused by the microcontroller having entered an undefined state, that is to say having crashed, as a result of a program error, or by the normal operation program having registered the existence of exceptional conditions and having triggered a complete or partial repetition of the operation preparation program to remedy those conditions.

In order that such a repetition may be carried out and normal operation may subsequently be resumed automatically, the transfer into the secured state when the normal operation indicating signal is absent is initially not yet final, so that, if the normal operation indicating signal returns within a predefined period of time, the controlled device is able to return from the secured state to its fully functioning operating state. Only when the normal operation indicating signal is missing for longer than the predefined period of time is the controlled device locked in the secured state, thus making a return to the fully functioning operating state impossible without external intervention.

If, for example, owing to an error in the programs of the microcontroller, execution of the normal operation program constantly leads to the occurrence of exceptional conditions, a conventional microcontroller system of that kind enters an endless loop which rotates through exceptional condition, repetition of the operation preparation program and execution of the normal operation program back to re-occurrence of the exceptional condition.

SUMMARY OF THE INVENTION

The present invention provides a microcontroller system and an operating method for a microcontroller system which make it possible to suppress the occurrence of endless loops of the type described above. That is achieved by virtue of the fact that the monitoring device has a register which is incremented each time the exceptional conditions occur, and the monitoring device is configured to lock the controlled device in the secured state if the contents of the register reach a predefined value. Thus, the number of possible occurrences of exceptional conditions before final locking takes place is limited to a fixed value. This does not require adaptations to be made to the programs that are to be executed by the microcontroller, and therefore the invention may be used for any control tasks, without complex adaptations to microcontroller systems.

The operation preparation program which is to carried out each time exceptional conditions occur may be specific to the exceptional conditions concerned, but is preferably contained in the operation preparation program that is executed at the start, that is to say, it includes at least some of the program instructions of the operation preparation program executed at the start.

Preferably, it is the microcontroller itself that is configured to recognise the occurrence of the exceptional conditions and to supply an exceptional condition indicating signal to the monitoring device. It is thus also possible for internal conditions of the microcontroller to be used as exceptional conditions, which would not be available to an exceptional condition recognition device implemented separately from the microcontroller.

Advantageously, the microcontroller has read-access to the register and is configured to carry out a comparison of the contents of the register before and after the outputting of an exceptional condition indicating signal. That allows the microcontroller to verify whether the monitoring unit is operating properly and, if applicable, generate an error warning.

That comparison of the contents of the register before and after the outputting of an exceptional condition indicating signal takes place preferably under the control of an operation preparation program. The program segment controlling the comparison may be especially a program segment that is executed only on starting of the system and not, however, as a result of an exceptional condition.

For the time period after which the secured state is locked when the normal operation indicating signal is absent it is possible to specify two different lengths, the monitoring device being configured to select the longer length of the time period when exceptional conditions are present and the shorter length when they are absent. In that manner, if the normal operation indicating signal is absent for an unknown reason, that is to say, if the absence is not caused by exceptional conditions that are known beforehand and taken into consideration in the development of the operating program of the microcontroller, it is possible to lock the secured state quickly and thus achieve a high degree of safety, whereas the time period up to locking when the exceptional conditions are present may be given a generous length, so that the operation preparation program may definitely be completed in that time period.

The register preferably has the same contents at each start of the system, so that, at each start of the system, the same number of exceptional conditions will be tolerated before the secured state is locked.

BRIEF DESCRIPTION OF THE DRAWING

The FIGURE is a block diagram of a microcontroller system according to the present invention.

DETAILED DESCRIPTION

The microcontroller system shown in the FIGURE is substantially composed of three components, a microcontroller module 1, an ASIC 2 and a device 3 controlled by microcontroller module 1, for examples valves of an anti-lock braking system for a motor vehicle.

The structure of microcontroller module 1 is known per se and does not need to be explained in more detail here. A program memory 4 of the microcontroller contains, in a section 7, instructions that are executed in continuous operation, which are referred to herein as the normal operation program, and sections 5 and 6 each of which contains instructions that have to be executed in preparation for continuous operation, but that are not repeated again during fault-free continuous operation, and which are referred to as the operation preparation program. When the system is started, for example by firing the engine of a motor vehicle in which it is installed, the microcontroller executes the instructions of sections 5 and 6 or, in the case of a reset—which will be explained in more detail later—, executes only those of section 6.

One of the tasks performed by the microcontroller in fault-free continuous operation, in addition to control of device 3, is regular periodic outputting of a dead-man pulse at an output W. The dead-man pulse is received by a watchdog circuit 8 of ASIC 2. A purely exemplary schematic structure is shown in the FIGURE to explain the mode of operation of watchdog circuit 8. The input of watchdog circuit 8 for the dead-man signal is an input of an AND gate 9 to the second input of which a high-level signal is applied by a NOT gate 10 after system start, with the result that the dead-man pulse passes through AND gate 9. Connected to the output of AND gate 9 is a reset input of a mono-stable trigger circuit or counter 11 which, triggered by the reset signal, begins to count from a fixed initial value. When counter 11 reaches a predefined end value, its output goes from logic low to high level, but the time that counter 11 requires for this is longer than the period of the dead-man signal of microcontroller 1, with the result that, under normal operating conditions, counter 11 is reset before the end value is reached and its output remains at low level.

If, however, a dead-man pulse fails to appear and the output of counter 11 goes to high level, that triggers a second counter 12. In addition, the output signal of counter 11 operates, via an OR gate 13, a switch 14 which cuts off device 3 from a supply voltage $V_\infty$ or otherwise disables operation of device 3. That is to say, the valves of the anti-lock braking system are no longer able to receive commands to open from microcontroller 1 and remain closed. Operation of the anti-lock braking system is thus disabled, and the brakes of the vehicle are controlled solely by actuation of a brake pedal. In that manner, if the absence of the dead-man pulse originates from an error of the operating program of the microcontroller, it is not possible for the valves to be controlled incorrectly and stop the action of the brakes at an inappropriate time. Watchdog circuit 8 brings about, therefore, by opening switch 14, a secured state of the anti-lock braking system, in which the possibility of the vehicle being endangered by a malfunction of the anti-lock braking system is excluded.

If a new dead-man pulse arrives from microcontroller 1 before second counter 12 has reached its end value, as described above that pulse passes through AND gate 9 and resets counter 11. The output of the latter returns to logic low level, counter 12 is thereby reset, and switch 14 closes again. As a result, device 3 becomes subject to the control of microcontroller module 1 again.

If, however, a further dead-man pulse does not arrive before counter 12 reaches its end value, the output thereof connected to NOT gate 10 goes from low to high level when its end value is reached, the output signal of NOT gate 10 goes to low level, and dead-man pulses from microcontroller 1 are no longer allowed through by AND gate 9. The system is now locked in the secured state.

Microcontroller module 1 has a reset output R with which it is able to put diverse peripheral modules, not shown, into a defined starting state. It is not possible for the state of watchdog circuit 8 to be influenced by a reset signal output at output R. Connected to that reset output is an input of a second AND gate 15 the second input of which is maintained at logic high level by a NOT gate 16 after starting of the system, so that the reset pulse passes through AND gate 15 and increments a counter 17 connected to its output. Counter 17 is a volatile semi-conductor memory the contents of which after starting of the system are zero in each case.

The output of counter 17 is connected to an input C of microcontroller module 1 and to an input of a comparator 18 to the second input of which a fixed numerical value from a non-volatile register 19 is applied. As long as the contents of counter 17 are smaller than the output value of register 19, comparator 18 supplies a logic low output level to OR gate 13. If, however, the contents of counter 17 reach the value of register 19, the output of comparator 18 goes to logic high level, as a result of which switch 14 opens and brings about the secured state. The secured state triggered by comparator 18 is a locked state; it is independent of whether dead-man pulses are available at output W. It is also not possible for it to be cancelled by the outputting of a reset signal from microcontroller module 1. It may be cancelled only by switching off the entire system, with the result that counter 17 loses its contents.

When the system is switched on, microcontroller module 1 begins to process the program instructions of the operation preparation program which are stored in section 5. Among those instructions, there is one for outputting a reset pulse to output R and subsequently reading the contents of counter 17 via input C. If the system is operating properly, the value read must be 1, since the contents of counter 17 are 0 at system start and counter 17 has been incremented once. If the value read is other than 1, the operating program branches to a suitable error interception routine, which includes outputting of a problem report to the driver and possibly the disabling of certain functions of microcontroller 1 if it is no longer possible to guarantee their reliability of operation. If the value read is 1, execution of the operation preparation program continues, including the instructions in section 6, and the microcontroller finally changes to execution of the normal operation program on the basis of the instructions of section 7 in which the dead-man pulses are regularly generated. The counting period of second counter 12 is selected to be longer than the time required to execute the operation preparation program, so that the fact that no dead-man pulses are generated during execution of the operation preparation program does not yet lead to locking of the secured state.

If the microcontroller detects exceptional conditions during execution of the normal operation program, that is to say detects predefined conditions that are not meant to occur during trouble-free execution of the normal operation program and the occurrence of which may indicate a fault, it automatically performs a reset. Exceptional conditions may, for example, be: access by a segment of the operating program to memory locations that are not cleared for access by that segment, unexpected behavior of peripheral modules, etc. Such a reset includes outputting of a reset pulse at output R and aborting of the normal operation program in order for the operation preparation program in section 6 of program memory 4 to be repeated. Outputting of the reset signal results in incrementing of counter 17 and the absence of dead-man pulses results in the secured state being brought about by watchdog circuit 8. Since the counting time of counter 12 is longer than the time required to execute the operation preparation program, locking of the secured state by watchdog circuit 8 does not, however, occur.

If, after the reset, the exceptional condition occurs again or if a different exceptional condition occurs, a new reset will take place each time until finally counter 17 reaches the value of register 19 and monitoring device 2 locks the secured state.

What is claimed is:

1. A microcontroller system, comprising:
   a microcontroller configured to:
      execute an operation preparation program at each start and under a predefined exceptional condition during operation;
      change to a normal operation program after the operation preparation program has been executed; and
      output, under a control of the normal operation program, a normal operation indicating signal;
   a device that is controllable by the microcontroller, the device corresponding to a controlled device; and
   a monitoring device for:
      monitoring whether the microcontroller is executing the normal operation program by reference to the normal operation indicating signal;
      transferring the controlled device into a secured state if the normal operation indicating signal is absent; and
      locking the controlled device in the secured state if the normal operation indicating signal is absent over a predefined period of time;
   wherein the monitoring device:
      includes a register that is incremented each time the predefined exceptional condition occurs;
      is configured to lock the controlled device in the secured state if a content of the register reaches a predefined value; and
      selects the predefined time period after which the secured state is locked when the normal operation indicating signal is absent such that it is longer when the exceptional conditions are present than when the exceptional conditions are absent.

2. The microcontroller system as recited in claim 1, wherein the operation preparation program that is carried out under the predefined exceptional conditions is included in the operation preparation program that is executed at the start.

3. The microcontroller system as recited in claim 1, wherein the microcontroller is configured to recognize an occurrence of the predetermined exceptional condition and to supply an exceptional condition indicating signal to the monitoring device.

4. The microcontroller system as recited in claim 3, wherein the microcontroller has read-access to the register and is configured to carry out a comparison of the content of the register before and after an outputting of the exceptional condition indicating signal.

5. The microcontroller system as recited in claim 4, wherein the comparison takes place under a control of the operation preparation program.

6. The microcontroller system as recited in claim 1, wherein the register has the same content at each start of the system.

7. The microcontroller system as recited in claim 1, wherein the microcontroller system is part of a safety system of a motor vehicle.

8. The microcontroller system as recited in claim 7, wherein the safety system includes one of an anti-lock braking system, an electrohydraulic brake system, an attitude-stabilizing system, and a wheel slip control system.

9. A method for operating a microcontroller system having a microcontroller, a device which is controllable by the microcontroller, and a monitoring device, comprising:
   executing, by the microcontroller, an operation preparation program at each start and under a predefined exceptional condition during operation;
   changing, by the microcontroller, to a normal operation program after the operation preparation program has been executed;
   outputting, by the microcontroller and under a control of the normal operation program, a normal operation indicating signal;
   monitoring, by the monitoring device, whether the microcontroller is executing the normal operation program by reference to the normal operation indicating signal;
   transferring, by the monitoring device, the controllable device into a secured state if the normal operation indicating signal is absent;
   locking the controllable device, by the monitoring device, in the secured state if the normal operation indicating signal is absent over a predefined period of time;
   incrementing a register of the monitoring device each time the predefined exceptional condition occurs;
   locking the controllable device, by the monitoring device, in the secured state if a content of the resister reaches a predefined value; and
   selecting, by the monitoring device, the predefined time period after which the secured state is locked when the normal operation indicating signal is absent such that it is longer when the exceptional conditions are present than when the exceptional conditions are absent.

* * * * *

UNITED STATES PATENT AND TRADEMARK OFFICE
CERTIFICATE OF CORRECTION

PATENT NO. : 7,653,837 B2 Page 1 of 1
APPLICATION NO. : 11/547949
DATED : January 26, 2010
INVENTOR(S) : Koerner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 345 days.

Signed and Sealed this

Twenty-third Day of November, 2010

David J. Kappos
*Director of the United States Patent and Trademark Office*